(Model.)
W. DAMER.
SHOE MAKER'S RULE.
No. 451,552. Patented May 5, 1891.
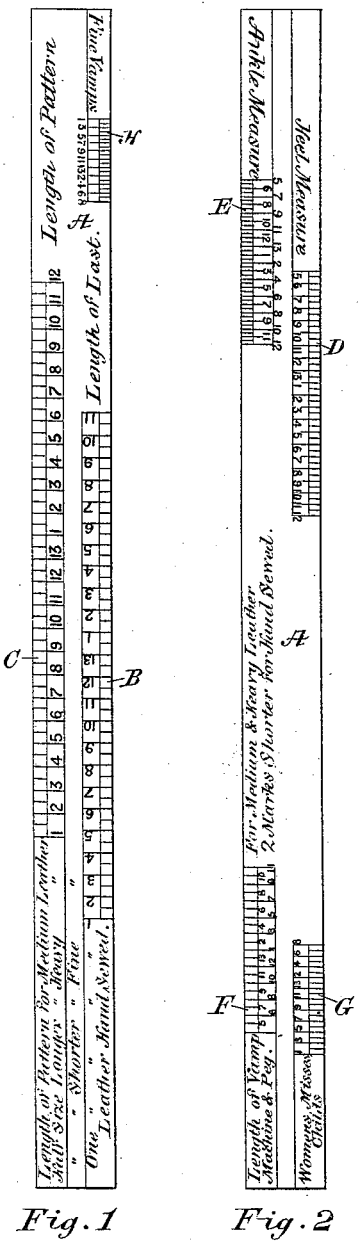
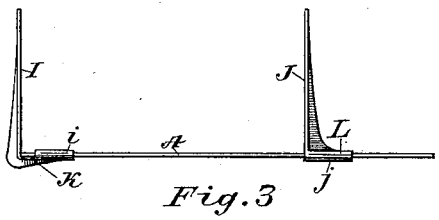
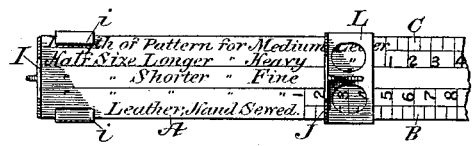
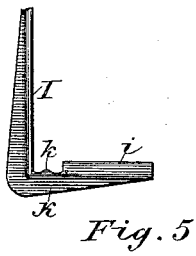
Fig. 1  Fig. 2
Witnesses  
Gustav. A. Priest  
Inventor  
William Damer  
Per Graham & Riches  
Attorneys.

UNITED STATES PATENT OFFICE.

WILLIAM DAMER, OF TORONTO, CANADA, ASSIGNOR TO MARY ANN DAMER, OF EAST SAGINAW, MICHIGAN.

SHOE-MAKER'S RULE.

SPECIFICATION forming part of Letters Patent No. 451,552, dated May 5, 1891.

Application filed November 27, 1889. Serial No. 331,749. (Model.)

*To all whom it may concern:*

Be it known that I, WILLIAM DAMER, a subject of the Queen of Great Britain, residing at Toronto, in the county of York and Province of Ontario, Canada, have invented or devised a new and useful Shoe-Maker's Rule, of which the following is a specification.

My invention relates to improvements in shoe-makers' rules; and the objects of my improvements are to provide a combination-rule for the use of shoe-makers, first, that will embrace all the measurements and sizes necessary in the manufacture of boots and shoes, the same being useful both as a bench-rule and as a size-stick; secondly, that in placing such a rule in the hands of the trade a uniformity and greater regularity of sizes will be established, and, thirdly, a saving of material gained by the increased precision in cutting out the work.

On reference to the accompanying drawings, similar letters refer to similar parts throughout the specification and said drawings.

Figure 1 represents one side of my improved rule drawn to half-size; Fig. 2, the reverse side of the same; Fig. 3, a side elevation of a portion of my improved rule when used as a size-stick, being fitted with detachable brackets for the purpose; Fig. 4, a plan view of the foregoing figure, and Fig. 5 a detail of the end bracket drawn to full size and part broken off.

My improved rule A, I prefer to form of any of the suitable metals or woods in the shape of a flat strip, rectangular in section and of sufficient width to have the different scales marked thereon. I also prefer to make it in two lengths, which I consider the most suitable sizes, the eighteen-inch one having the scales arranged, as shown in the drawings, on both sides, and in all cases measuring from the end next the scale; or in the twenty-four-inch length all the scales can be arranged conveniently on the one side, while on the other side it can be subdivided into any convenient scale of parts of a twenty-four-inch or two-foot rule.

The scale B, marked as "length of last," is the ordinary measure employed when used as a size-stick to measure the foot, and is the one upon which all the others are based and regulated, and is also the one by which the foot is measured, and founded on the barleycorn measure, or three parts in an inch. For convenient reading it is marked to read from the end toward the center and operator in using it.

Scale C, marked "length of pattern," will be observed to be of slightly-enlarged subdivisions compared with the scale B, increasing each subdivision about the forty-second (42d) part of an inch larger than said scale B, and beginning about one and one-quarter inches farther from the initial point or the end, and is the one by which a pattern would be made or cut to form a shoe corresponding to the size measured by said scale B, the additional size allowing for seams and turning in to attach the sole. As the thickness of the leather varies and would have more or less effect on this scale or the work cut out by it, instructions attend it, as shown in the drawings, to instruct in its use and guide the operator.

The scale D, marked "heel-measure," is the one by which the distance from the heel of the pattern diagonally across to the instep is measured and is a scale of such subdivision that the 5 of the children's measure is four inches from the end or initial point of measurement, and the 5 of adult's measure is six and a half inches from the same point, the size here, as in all others, increasing or diminishing with the length measured on scale C, or the length of the pattern.

Scale E, below scale D, is marked "ankle measure," and is the one on which the width of the pattern for lace-shoes above the ankle and across the top edge is measured, or twice this distance, indicated by any particular numeral thereon, would just span or meet around the ankle. It is a scale of one-eighth inch subdivision. The 5 of children's sizes is about two and seven-tenths inches from the end of the rule.

Scale F, marked "length of vamp, machine, and peg," is the scale on which the length of the vamp or that part of the pattern from the point of the toe to the beginning of the lacing up the center is measured, or the central length of the pattern will indicate the length of the pattern and the size of shoe it will make when finished and the size of last on which to make it up. It is practically a scale of eighth-inch subdivisions, the 4 of the children's sizes being two and four-tenths inches and the 12 of adult's sizes five inches from the initial point of measurement or end of the rule.

The scale G, below the scale F, marked "women's, misses' child's," almost explains itself or its use at first sight when in company with the foregoing scale F. It is a scale of which the subdivisions are twelfths of an inch, and 1 on the children's sizes is about two inches from the end of rule, and the 8 of adult's size three and two-thirds inches from the end of the rule.

The scale H, marked "fine vamps," in Fig. 1, is intended to accompany the foregoing scales F and G, but intended for use on fine leather intended for a special form of shoe having a variation in this particular part. The scale of "fine vamps" is a sixteenth-inch subdivision one, the 1 of children's sizes being one and three-quarter inches and the 8 of adult's size three inches from the initial point or end of rule A, respectively.

In Figs. 3 and 4 are shown detachable end and sliding brackets I and J, respectively, applied to my rule and adapting it to be used as a size-stick for measuring the foot. The end bracket I is formed as shown and is essentially a standard or an arm at right angles to the rule A, by which any object can be measured that will not or cannot be made to conform in shape to the scale or rule, or vice versa. The said bracket I has clips *i* formed in its shorter limb K, under which the rule A is fitted, and is gripped sufficiently to hold it engaged by a ridge *k*, extending across the limb at the point shown, which causes a slight springing of the end of the rule A engaged. The sliding bracket J is similarly grooved to slide along the rule, as shown; but unlike the bracket I the clips *j*, in which the rule A slides, are formed on the under side of the limb L instead of the top, as in the limb K of the bracket I.

Having now described the purposes of the different scales contained in my improved rule, what I claim, and desire to secure by Letters Patent, is—

1. In a rule for use in the shoe trade, the scale of divisions indicated "length of pattern" and composed of the first division, which is five and forty-five one-hundredths inches long, and the following divisions therein, each the one-forty-second part of an inch larger than those of the barleycorn-scale, and the instructions indicated therewith to guide in the use of the said scale of length of pattern, substantially as and for the purpose specified.

2. In a rule for use in the shoe trade, the scale indicated "heel measure," placed on said rule so that the 5 of children's sizes is four inches from the initial point of measurement, said scale continuing by three-sixteenth-inch divisions and numbered to correspond to the barleycorn-scale aforesaid, substantially as and for the purpose specified.

3. In a rule for use in the shoe trade, the scale indicated "ankle measure," placed on said rule so that the 5 of children's sizes is two and seven-tenths inches from the end thereof, said scale continuing by eighth-inch divisions numbered to correspond to the barleycorn and other scales aforesaid, substantially as and for the purpose specified.

4. In a rule for use in the shoe trade, the scale indicated "length of vamp, machine and peg," placed on said rule so that the 4 of children's sizes is two and four-tenths inches from the end thereof, said scale continuing by eighth-inch divisions numbered to correspond to said barleycorn and other scales aforesaid, substantially as and for the purpose specified.

5. In a rule for the use specified, the scale indicated "women's, misses', child's," located on said rule so that the primary division thereof is two inches long, the said scale continuing by twelfth-inch divisions and numbered to correspond to those of the barleycorn and other scales aforesaid, substantially as and for the purpose specified.

6. In a rule for use as specified, the scale indicated "fine vamps," located on said rule so that the primary division is one and three-fourths inch long and the other divisions one-sixteenth part of an inch each and numbered to correspond to those on the barleycorn and other scales aforesaid, substantially as and for the purpose specified.

7. In combination with a rule for use in the shoe trade, having the ordinary barleycorn or size-stick scale thereon, the scale indicated "length of pattern" and composed of a series of divisions, the first one of which is five and forty-five one-hundredths inches from the end of said scale, the second and subsequent divisions are each the forty-second part of an inch larger than those of the said barleycorn-scale and are similarly numbered thereto, and the instructions indicated therewith to guide in the use of said scale of length of pattern, substantially as and for the purpose specified.

8. A rule for shoe-makers' use, provided with the following scales, to wit: length of last, length of pattern, heel measure, ankle measure, length of vamp, women's, misses', child's, and fine vamps, marked, stamped, or otherwise indicated thereon and arranged on one or both sides of said rule, substantially as shown and described.

9. In combination with a rule for the use specified, the stationary or end bracket I, having the limb K, on which are formed the clips $i$ and the ridge $k$, substantially as shown and described.

10. In combination with a rule for the use specified, the sliding or movable bracket J, having the limb L and clips $j$, substantially as shown and described.

Toronto, November 19, 1889.

WM. DAMER.

Witnesses:
JNO. BIEKEIL,
GUSTAV A. PRIEST.